United States Patent [19]

Gupta et al.

[11] Patent Number: 5,396,144
[45] Date of Patent: Mar. 7, 1995

[54] ROTATION RATE SENSOR WITH CENTER MOUNTED TUNING FORK

[75] Inventors: Piyush K. Gupta, Antioch; Craig E. Jenson, San Ramon, both of Calif.

[73] Assignee: New S.D., Inc., Concord, Calif.

[21] Appl. No.: 100,760

[22] Filed: Aug. 2, 1993

[51] Int. Cl.⁶ .................. H01L 41/08; G01C 19/56
[52] U.S. Cl. .................... 310/370; 310/348; 310/367
[58] Field of Search ............ 310/348, 366, 367, 370, 310/338, 339; 73/505

[56] References Cited

U.S. PATENT DOCUMENTS

| Re. 32,931 | 5/1989 | Staudte | 73/505 |
| 3,354,413 | 11/1967 | Ko | 310/321 |
| 3,697,766 | 10/1972 | Ganter | 310/348 |
| 3,697,789 | 10/1972 | Kato et al. | 310/344 |
| 4,368,402 | 1/1983 | Mitori et al. | 310/367 |
| 4,379,244 | 5/1983 | Dinger | 310/366 |
| 4,524,619 | 6/1985 | Staudte | 73/505 |
| 4,538,461 | 9/1985 | Juptner | 73/505 |
| 4,583,063 | 4/1986 | Milson | 310/367 |
| 4,654,663 | 3/1987 | Alsenz | 73/505 |
| 4,742,260 | 5/1988 | Shimizu et al. | 310/323 |
| 4,930,351 | 6/1990 | Macy et al. | 73/505 |
| 5,056,366 | 10/1991 | Fersht | 73/505 |
| 5,166,571 | 11/1992 | Konno et al. | 310/333 |

FOREIGN PATENT DOCUMENTS

| 0039391 | 5/1977 | Japan | 310/370 |
| 0021679 | 2/1980 | Japan | 310/370 |
| 0188126 | 11/1982 | Japan | 310/370 |
| 0217114 | 9/1987 | Japan | 73/505 |
| 0217115 | 9/1987 | Japan | 73/505 |
| 2067009 | 7/1981 | United Kingdom | 310/348 |
| 0125821 | 3/1960 | U.S.S.R. | 310/367 |

*Primary Examiner*—Thomas M. Dougherty
*Attorney, Agent, or Firm*—Flehr, Hohbach, Test, Albritton and Herbert

[57] ABSTRACT

A rotation rate sensor which uses a double ended tuning fork having a mounting base with only a single exclusive mounting surface. The mounting base is surrounded and centrally disposed within the body of the tuning fork. The mounting base is joined to the body by a suspension system which is also disposed within the body of the tuning fork. The tuning fork is mounted in the housing only at the single exclusive mounting surface.

23 Claims, 15 Drawing Sheets

ROTATION RATE SENSOR WITH CENTER MOUNTED TUNING FORK

The present invention relates generally to rotation rate sensors which employ double ended (i.e. H-shaped) tuning forks formed from piezoelectric materials. In particular, it pertains to an improvement for mounting a double ended tuning fork in the housing of a rotation rate sensor.

The present application is also related to the copending, concurrently filed, and commonly assigned U.S. patent application entitled "Rotation Rate Sensor with Built in Test Circuit" Ser. No. 08/100,759, by A. Florida, P. Gupta, D. Macy, and H. Morris. This application is expressly incorporated herein.

There are two current approaches for mounting a double ended tuning fork in a sensor housing. Both approaches require the tuning fork to have bridges externally joined to the tuning fork body on opposite sides of the body. In the first approach, each bridge has a mounting surface which is secured to the sensor housing. In the second approach, the bridges are joined to a frame which surrounds the tuning fork and has multiple mounting surfaces for securing the frame to the sensor housing. Since the bridges in the first approach and the bridges and the frame in the second approach are integrally joined to the tuning fork, the mounting surfaces in both approaches are of the same piezoelectric material as the tuning fork.

A problem associated with these approaches is that the coefficients of thermal expansion of the piezoelectric material of the mounting surfaces and the housing material are mismatched at the mounting points. Thus, as the operating temperature of the rotation rate sensor varies, strains are imparted on the tuning fork due to the mismatched expansion or contraction of the piezoelectric material and the housing materials. As a result, the frequencies of the drive, pickup, and other modes will vary substantially from the desired frequencies of these modes. In order to match the thermal coefficients of expansion as close as possible, the housing material to which the piezoelectric material of the mounting surfaces are mounted is typically limited to the Nickel Alloy Monel 400.

The described multiple mounting surface approaches have another significant problem. The tuning forks of these approaches have a number of modes of vibration which have frequencies below 2,500 Hz. As a result, these modes can be easily induced by common external vibrations.

Still another problem associated with the multiple mounting surface approaches involves the number of tuning forks which can be produced from a single wafer of piezoelectric material. The tuning forks of the first approach described have a large area due to the fact that bridges are externally joined to opposite sides of the tuning fork body. Moreover, the tuning forks of the second approach described have even a larger area in that external bridges and a surrounding frame are integrally joined to the tuning fork. As a result, the number of tuning forks which can be etched from a single wafer of piezoelectric material in both of these approaches is very limited.

It is therefore an object of the invention to provide a rotation rate sensor which minimizes the effects of the mismatched thermal coefficients of expansion of the materials of the sensor housing and the double ended tuning fork.

It is another object of the invention to provide a rotation rate sensor employing a double ended tuning fork which has a reduced number of vibration modes below the drive and pickup modes.

It is still another object of the invention to provide a rotation rate sensor employing a double ended tuning fork which only has vibrational modes with frequencies above 2,500 Hz.

It is further an object of the invention to provide a rotation rate sensor employing a double ended tuning fork which has a reduced area in order to maximize the number of tuning forks that can be etched per wafer of piezoelectric material.

The foregoing and other objects of the invention are achieved by a rotation rate sensor which uses a double ended tuning fork having a mounting base with only a single exclusive mounting surface. The mounting base is surrounded and substantially centrally disposed within the body of the tuning fork. The mounting base is joined to the body by a suspension system which is also disposed within the body of the tuning fork. The tuning fork is mounted in the housing only at the single exclusive mounting surface.

Figure 1:
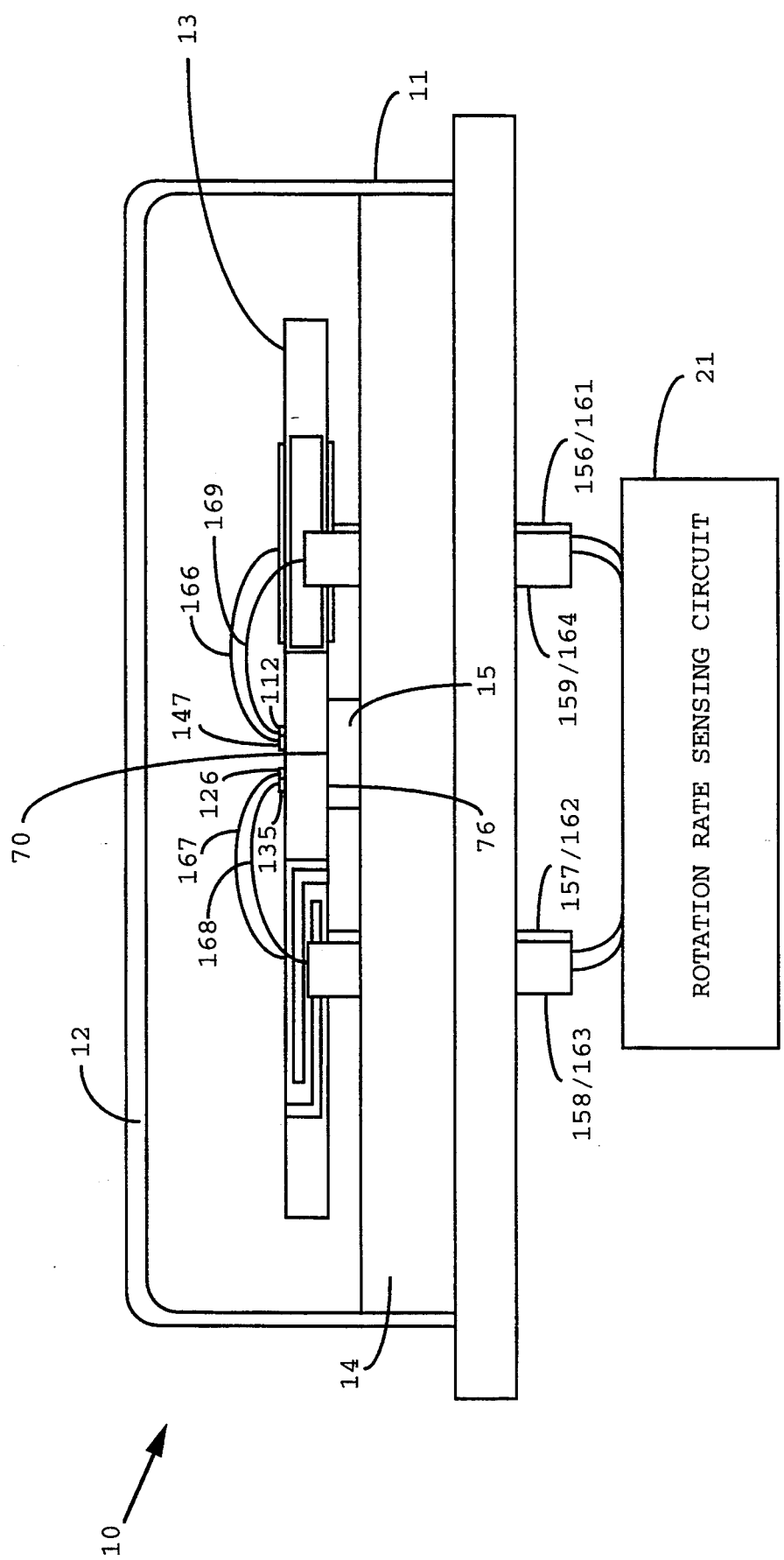
FIG. 1 is a cross sectional side view of a rotation rate sensor in accordance with the present invention.

FIG. 1 shows a rotation rate sensor 10. The rotation rate sensor 10 comprises a housing 11, a double ended (i.e. H-shaped) tuning fork 13, and a rotation rate sensing circuit 21. The housing includes a lid 12, a base 14, and a mounting structure 15.

The tuning fork 13 is etched from a single crystal of a piezoelectric material. This material may be quartz, Lithium Niobate, or some other piezoelectric substance. The orientation of the tuning fork 13 is defined by the X, Y, and Z axes shown in FIGS. 2 and 3. These axes correspond to the alignment of the molecular structure of the crystal. As is illustrated by the two figures, the tuning fork 13 is oriented in the XY plane.

Figure 2:
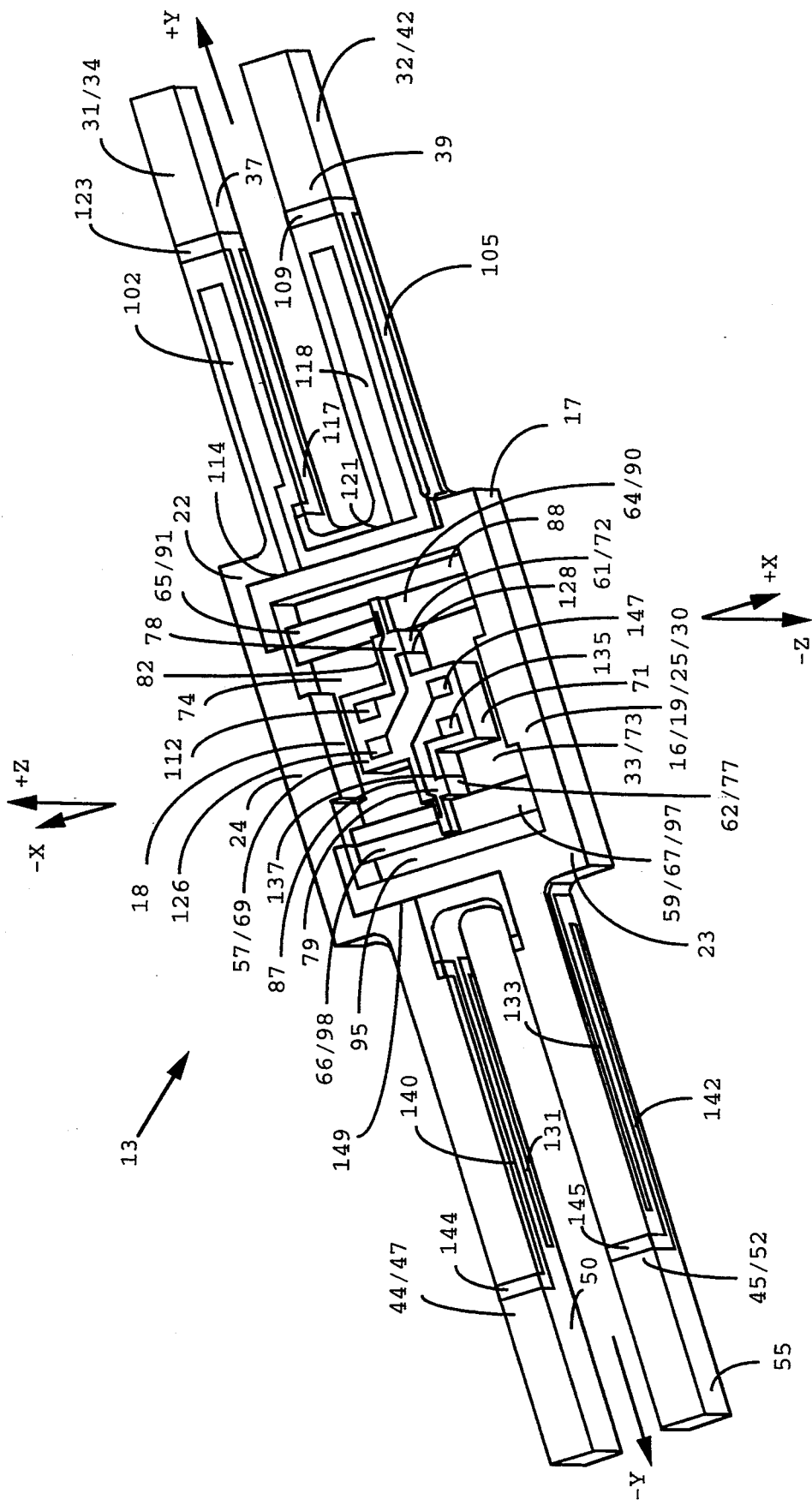
FIG. 2 is a three dimensional view of the front of the double ended tuning fork of the rotation rate sensors shown in FIGS. 1, 10, and 12.
Figure 3:
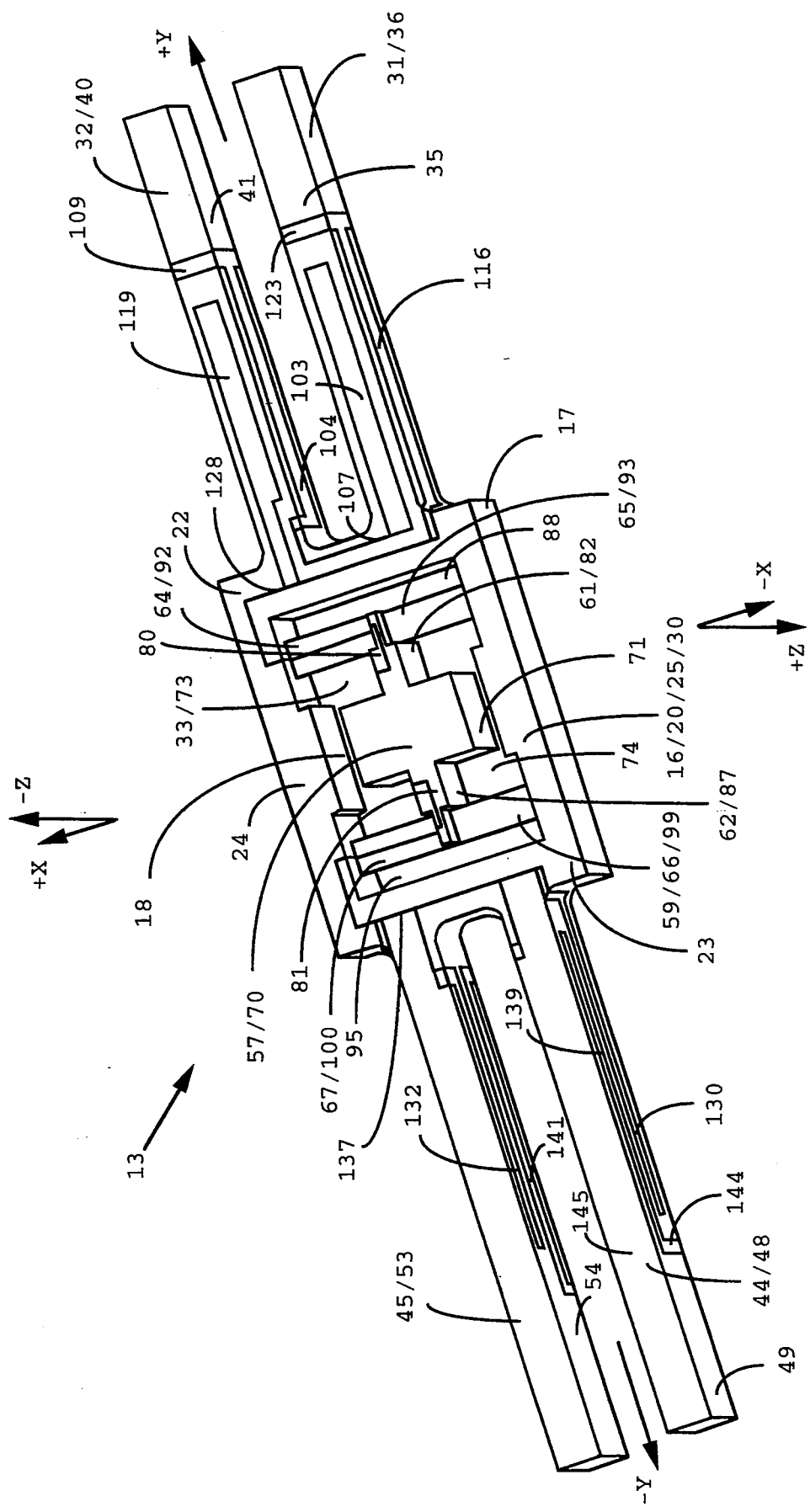
FIG. 3 is a three dimensional view of the back of the double ended tuning fork shown in FIG. 2.

As shown in FIGS. 2 and 3, the body 16 of the tuning fork 13 has a peripheral frame 30 and an internal cavity 33. The frame 30 has an external perimeter surface 17 and an internal perimeter surface 18 defining a cavity 33. Both of the perimeter surfaces 17 and 18 are perpendicular to the XY plane. The frame 30 has a front surface 19 and back surface 20 which each lie in a plane parallel to the XY plane. Thus, the frame 30 is oriented in the XY plane.

The drive tines 31 and 32 of the tuning fork 13 are joined to the external perimeter surface 17 of the frame 30 at the cross limb 22 of frame 30 and extend parallel to each other in the +Y direction. The drive tine 31 has a front 34, a back surface 35, and two side surfaces 36 and 37. The drive tine 32 has a front 39, a back surface 40, and two side surfaces 41 and 42. The front and back surfaces 34, 35, 39, and 40 each lie in a plane parallel to the XY plane while the side surfaces 36, 37, 41, and 42 each lie in a plane parallel to the YZ plane. Thus, the drive tines 31 and 32 are oriented in the XY plane.

The pickup tines 44 and 45 of the tuning fork 13 are also joined to the external perimeter surface 17 of the frame 30 at the cross limb 23 of frame 30 but extend parallel to each other in the −Y direction. The pickup tine 44 has a front surface 47, a back surface 48, and two side surfaces 49 and 50. The drive tine 45 has a front surface 52, a back surface 53, and two side surfaces 54 and 55. The front and back surfaces 47, 48, 52, and 53 each lie in a plane parallel to the XY plane while the side surfaces 49, 50, 54, and 55 each lie in a plane parallel to the YZ plane. Thus, the pickup tines 44 and 45 are oriented in the XY plane.

The tuning fork 13 has a single exclusive mounting base 57. The mounting base 57 is space from surrounded by and centrally disposed within the internal perimeter surface 18 of the frame 30. The mounting base is also joined to the internal perimeter surface 18 by a suspension system 59 formed by the cross bridges 61 and 62 and the suspension bridges 64–67. The mounting base 57 has a front surface 69, a back surface 70, and a perimeter surface 71.

The front and back surfaces 69 and 70 each lie in a plane parallel to the XY plane while the perimeter surface 71 is perpendicular to the XY plane. Thus, it is clear that the mounting base 57 is oriented in the XY plane. Furthermore, the perimeter surface 71 is separated from the internal perimeter surface 18 of the body 16 in the +X direction by the opening 73 and in the −X direction by the opening 74.

Figure 4:
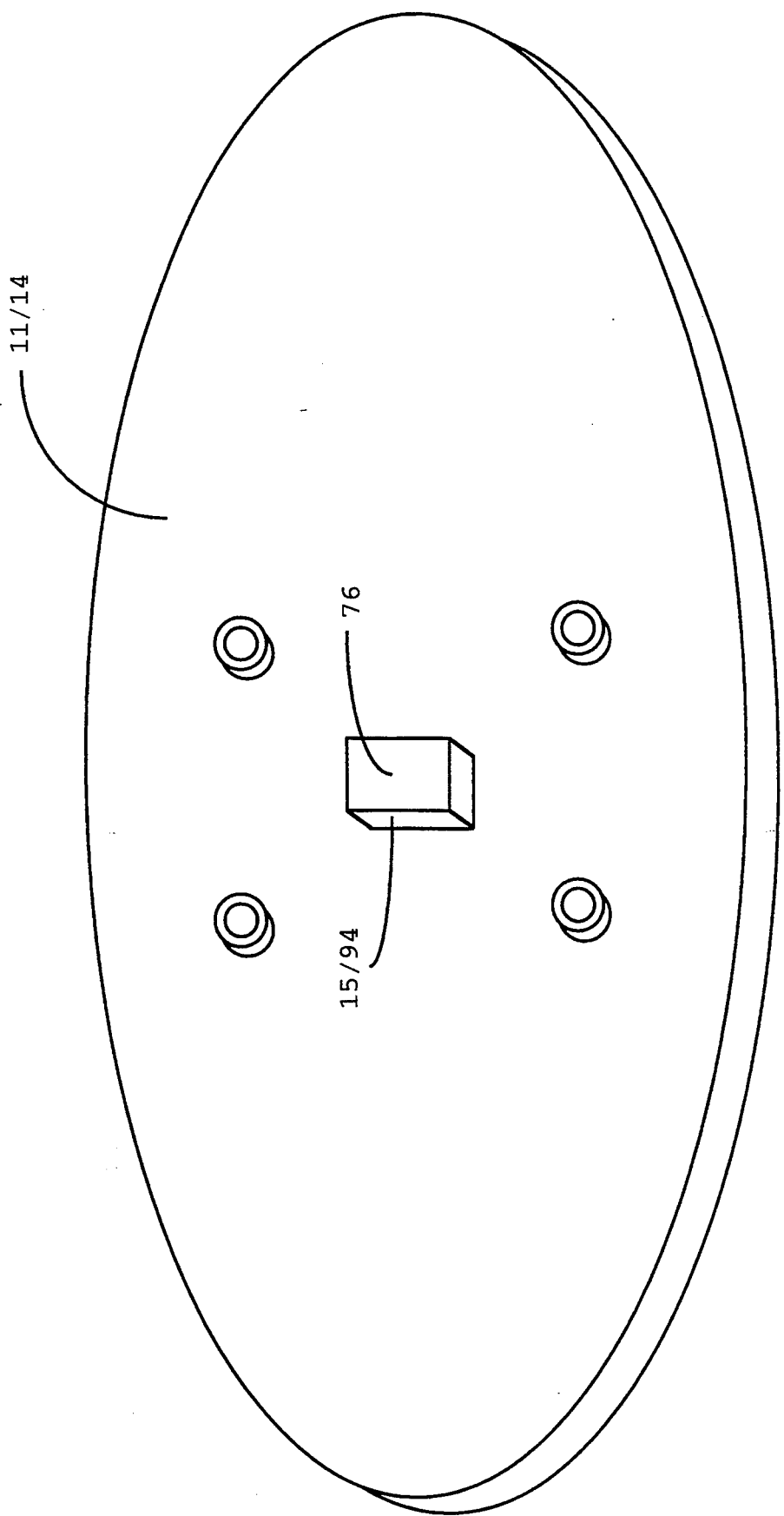
FIG. 4 is a three dimensional view of the base and mounting structure of the housing of the rotation rate sensor shown in FIG. 1.

FIG. 4 shows the base 14 and the mounting structure 15 of the housing 11. The mounting structure 15 is a pedestal 94. The pedestal 94 has a mounting surface 76 which has approximately the same dimensions as does the mounting surface 59 of the tuning fork 13.

Referring back to FIG. 1, the tuning fork 13 is mounted to the pedestal 94. The back surface 70 of the mounting base 57 is the single exclusive mounting surface of tuning fork 13. This surface is fixed to the mounting surface 76 of pedestal 15. This may be done with any conventional thermal plastic adhesive or epoxy. Thus, the tuning fork 13 is mounted within the housing 11 only at the single exclusive mounting surface 70.

The pedestal 94 of this embodiment may be formed of stainless steel, aluminum, the Nickel alloy Monel 400, or any other suitable metal, metal alloy, or ceramic. It can also be separately scribed from a polished silicon or quartz wafer and fixed to base 14 using an epoxy.

Referring back to FIGS. 2 and 3, as was indicated earlier, the suspension system 59 joins the mounting base 57 to the frame 30. In doing so, the suspension system 59 enables the drive tines 31 and 32 to properly experience time-varying Coriolis acceleration in equal and opposite directions when the tuning fork 13 is subjected to a rotation about the Y axis. Furthermore, the suspension system 59 allows the torque transfer limbs 24 and 25 of the frame 30 to properly couple to the pickup tines 44 and 45 the time-varying torsion experienced by the frame 30 and created by the time-varying Coriolis accelerations.

The cross bridges 61 and 62 of the suspension system 59 are each joined to the mounting base 57. The cross bridge 61 extends from the mounting base 57 in the +Y direction between the openings 73 and 74 of cavity 33. However, the cross bridge 62 extends from the mounting base 57 in the −Y direction between the openings 73 and 74. The cross bridge 61 has front surface 78, back surface 80, and side surfaces 72 and 82. The cross bridge 62 has front surface 79, back surface 81, and side surfaces 77 and 87. The surfaces 78–81 each lie in a plane parallel to the XY plane while the surfaces 72, 77, 82, and 87 are perpendicular to the XY plane. Thus, the cross bridges 61 and 62 are oriented in the XY plane.

The thin suspension bridges 64 and 65 of the suspension system 59 are each joined to the cross bridge 61 and to the internal perimeter surface 18 of the frame 30. As shown, the thickness of the suspension bridges 64 and 65 is considerably less than the thickness of the cross bridge 61. The suspension bridge 64 extends from the cross bridge 61 to the internal perimeter surface 18 in the +X direction between the openings 73 and 88 of cavity 33. However, the suspension bridge 65 extends from the cross bridge 61 to the internal perimeter surface 18 in the −X direction between the openings 74 and 88. The suspension bridges 64 and 65 respectively have front surfaces 90 and 91 and back surfaces 92 and 93 which each lie in a plane parallel to the XY plane. Thus, the suspension bridges 64 and 65 are oriented in the XY plane.

The thin suspension bridges 66 and 67 of the suspension system 59 are each joined to the cross bridge 62 of the tuning fork 13 and to the internal perimeter surface 18 of the body 16. The thickness of the suspension bridges 66 and 67 is considerably less than the thickness of the cross bridge 62. The suspension bridge 67 extends from the cross bridge 62 to the internal perimeter surface 18 in the +X direction between the openings 73 and 95. However, the suspension bridge 66 extends from the cross bridge 62 to the internal perimeter surface 18 in the −X direction between the openings 74 and 95 of cavity 33. The suspension bridges 66 and 67 respectively have front surfaces 97 and 98 and back surfaces 99 and 100 which each lie in a plane parallel to the XY plane. Thus, the suspension bridges 66 and 67 are oriented in the XY plane.

The pair of drive high electrodes 102 and 103 of drive tine 31 are respectively located on the surfaces 34 and 35 of drive tine 31. The pair of drive high electrodes 104 and 105 of drive tine 32 are respectively located on the side surfaces 41 and 42 of drive tine 32.

The electrode 103 of drive tine 31 is coupled to the electrode 104 of drive tine 32 by the lead 107. Portions of the lead 107 are disposed on the back surface 20 of the frame 30 and the back surface 40 of the drive tine 32.

The electrodes 104 and 105 of drive tine 32 are coupled together by the lead 109. The lead 109 is disposed respectively on the front, back, and side surfaces 39, 40, 41, and 42 of drive tine 32.

The electrodes 102 and 105 are coupled to each other and to the drive high contact pad 112 by the lead 114. The contact pad 112 is disposed on the front surface 69 of the mounting base 57. Portions of the lead 114 are disposed on the front surface 19 of the frame 30, the front surface 91 of suspension bridge 65, the side and front surfaces 82 and 78 of cross bridge 61, and the front surface 69 of the mounting base 57.

From the foregoing it is clear that the electrodes 102-105 are coupled together by the leads 107, 109, and 114. As a result, the lead 114 provides the electrodes 102-105 with the same signal.

The pair of drive low electrodes 116 and 117 of drive tine 31 are respectively located on the side surfaces 36 and 37 of drive tine 31. The pair of drive low electrodes 118 and 119 of drive tine 32 are respectively located on the front and back surfaces 39 and 40 of drive tine 32.

The electrode 118 of drive tine 32 is coupled to the electrode 117 of drive tine 31 by the lead 121. Portions of the lead 121 are disposed on the front surface 19 of the frame 30 and the front surface 34 of the drive tine 31.

The electrodes 116 and 117 of drive tine 31 are coupled together by the lead 123. The lead 123 is disposed respectively on the front, back, and side surfaces 34, 35, 36, and 37 of drive tine 31.

The electrodes 116 and 119 are coupled to each other and to the drive low contact pad 126 by the lead 128. The contact pad 126 is disposed on the front surface 69 of mounting base 57. Portions of the lead 128 are disposed on the back surface 20 of the frame 30, the back surface 92 of suspension bridge 64, the back, side, and front surfaces 80, 72, and 78 of cross bridge 61, and the front surface 69 of the mounting base 57.

Thus, the electrodes 116-119 are coupled together by the leads 121, 123, 124, and 128. As a result, the lead 128 provides the contact pad 126 with a signal which is a summation of the signals received from the electrodes 116-119.

The pair of pickup high electrodes 130 and 131 of pickup tine 44 are respectively located on the side surfaces 49 and 50 of pickup tine 44. The pair of pickup high electrodes 132 and 133 of pickup tine 45 are respectively located on the side surfaces 54 and 55 of pickup tine 45.

The electrodes 130-133 are each coupled to the pickup high contact pad 135 by the lead 137. The contact pad 135 is disposed on the front surface 69 of the mounting base 57. Portions of the lead 137 are disposed on the back surface 20 of frame 30, at the junction of the side surface 49 of pickup tine 44 and the external perimeter surface 17 of the frame 30, at the junction of the side surface 55 of pickup tine 45 and the external perimeter surface 17 of the frame 30, on the back surface 48 of pickup tine 44, on the back surface 53 of pickup tine 45, on the back surface 100 of suspension bridge 67, on the back, side, and front surfaces 81, 77, and 79 of cross bridge 62, and the front surface 69 of mounting base 57. As a result, the lead 137 provides the contact pad 135 with a signal which is a summation of the signals received from the electrodes 130-133.

The pair of pickup low electrodes 139 and 140 of pickup tine 44 are respectively located on the side surfaces 49 and 50 of pickup tine 44. The pair of pickup low electrodes 141 and 142 of pickup tine 45 are respectively located on the side surfaces 54 and 55 of pickup tine 45.

The electrodes 139 and 140 are each coupled together by the lead 144. The lead 144 is disposed on the front and side surfaces 47, 49, and 50 of pickup tine 44.

The electrodes 141 and 142 are each coupled together by the lead 145. The lead 145 is disposed on the front, side, and back surfaces 52, 54, and 55 of pickup tine 45.

The electrodes 140 and 141 are coupled to the pickup low contact pad 147 by the lead 149. The contact pad 147 is disposed on the front surface 69 of the mounting base 57. Portions of the lead 149 are disposed on the front surface 47 of pickup tine 44, the front surface 52 of pickup tine 45, the front surface 19 of body 16, on the front surface 98 of suspension bridge 66, on the side and front surfaces 87 and 79 of cross bridge 62, and the front surface 69 of mounting base 57.

Thus, the electrodes 139-142 are coupled together by the leads 144, 145, and 149. As a result, lead 149 provides the pickup electrodes 139-142 with the same signal.

All of the described electrodes, leads (i.e. traces), and contact (i.e. wirebonding) pads may be formed from vapor deposition of gold. The deposited gold may be trimmed by use of conventional photolithographic techniques and by use of aperture masks.

Figure 5:
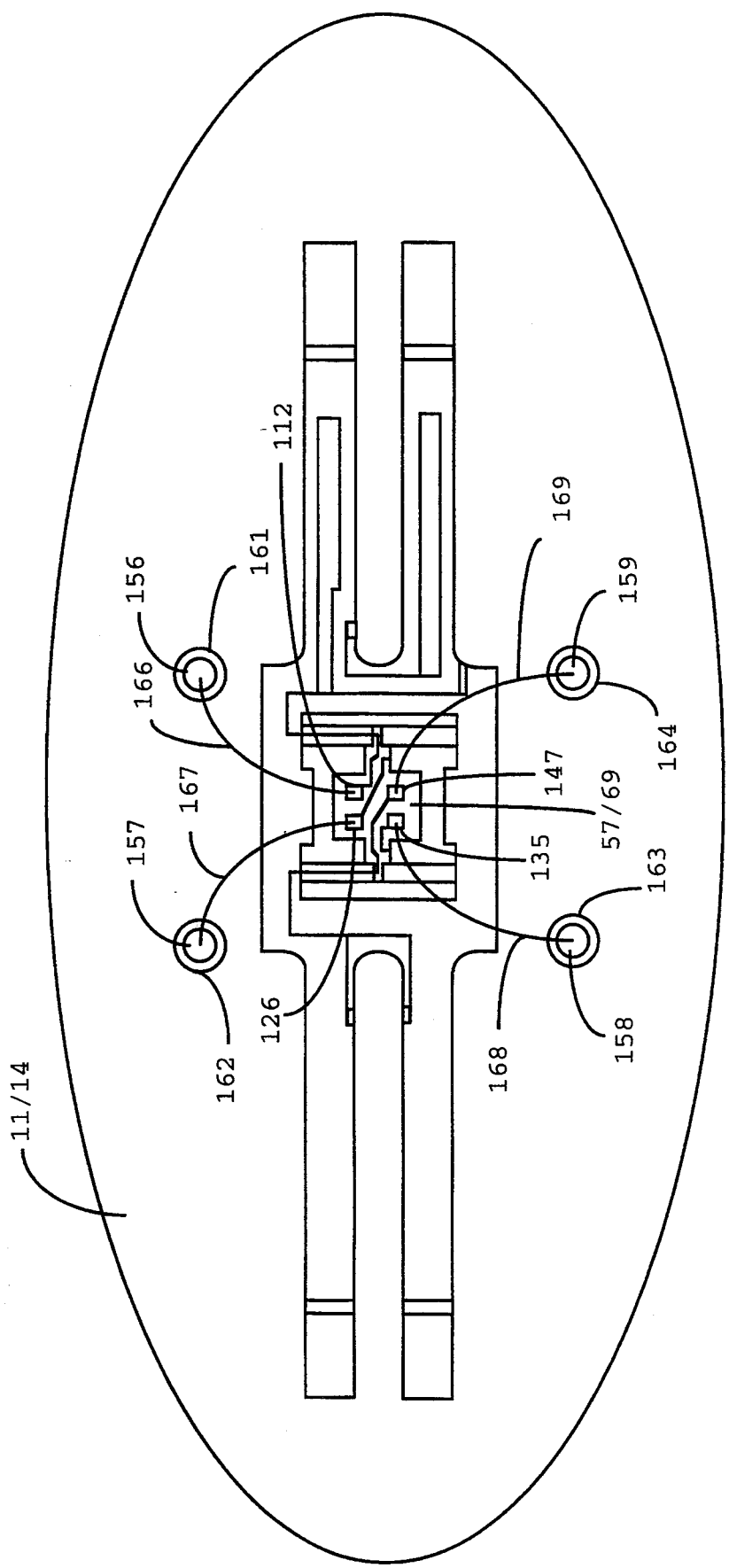
FIG. 5 is a top view of the tuning fork of FIGS. 2 and 3 mounted to the mounting structure of FIG. 4.

As shown in FIG. 5, the base 14 of the housing 11 includes the drive high feedthrough 156, the drive low feedthrough 157, the pickup high feedthrough 158, and the pickup low feedthrough 159. The feedthroughs 156-159 are respectively surrounded by the insulating rings 161-164 so as to form hermetic and electrically insulating seals. The material used for the feedthroughs 156-159 is chosen with respect to the material of the base 14 of the housing 11. For example, if the base 14 is made of the Nickel Alloy Monel 400, the feedthroughs 156-159 are made of iron-nickel alloy 52. The insulating rings may be any insulating material including glass.

The back surface 70 of the mounting base 57 is mounted to the pedestal 15 and the surface 69 of the base 57 and the contact pads 112, 126, 135, and 147 are exposed. The feedthroughs 156-159 are respectively coupled to the contact pads 112, 126, 135, and 147 by the wirebonds 166-169. The material used for the wirebonds 166-169 is gold wire. As shown in FIG. 1, the feedthroughs 156-159 are coupled to the rotation rate sensing circuit 21 of the rotation rate sensor 10.

Figure 6:
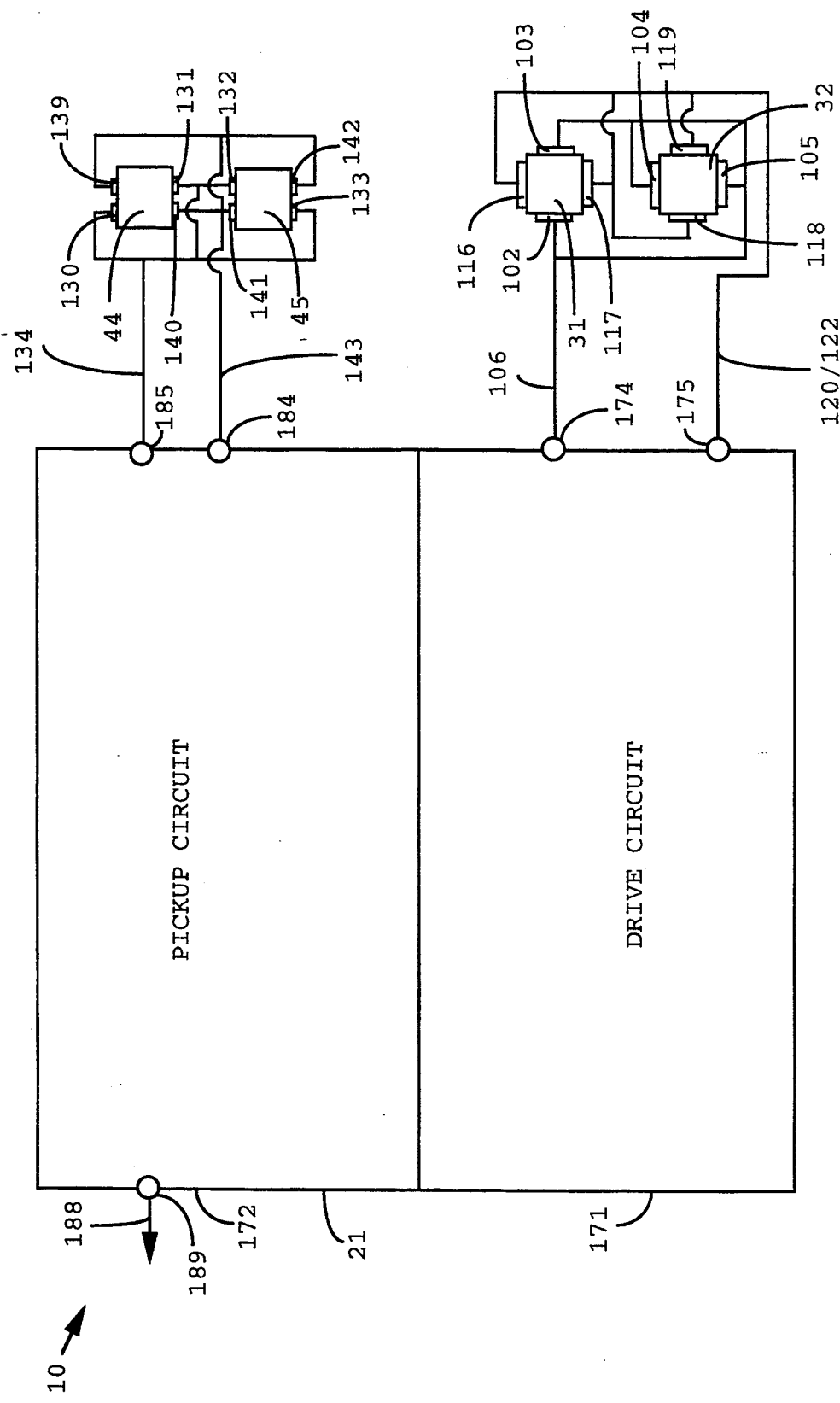
FIG. 6 is a diagram of the rotation rate sensing circuit of the rotation rate sensors of FIGS. 1, 10, and 12.

Turning to FIG. 6, the sensing circuit 21 includes a drive circuit 171 and a pickup circuit 172. The drive and pickup circuits 171 and 172 are of the type well known in the art.

The drive circuit 171 generates the drive high signal 106 and outputs it at the drive high output terminal 174. The drive high signal 106 is sent from the output terminal 174 to the drive high electrodes 102-105. This is done via the drive high feedthrough 156, the drive high wirebond 166, the drive high contact pad 112, and the leads 107, 109, and 114 (not shown). The drive high signal is applied to the drive tines 31 and 32 by the electrodes 102-105.

The drive circuit also includes a drive low output terminal 175. The drive circuit provides a virtual ground 122 and receives a drive low signal 120 at the terminal 175. The virtual ground 122 is provided to and the drive low signal 120 is received from the drive low electrodes 116-119 via the drive low feedthrough 157, the drive low wirebond 167, the drive low contact pad 126, and the leads 121, 123, and 128 (not shown). The virtual ground 122 is applied to the drive tines 31 and 32 by the electrodes 116-119.

As is well known in the art, the drive high signal 106 and the virtual ground 122 applied to the drive tines 31 and 32 cause strains in the piezoelectric material of the drive tines 31 and 32. These strains induce the drive tines 31 and 32 to vibrate generally in opposite directions in the XY plane at their resonant frequency. This is known as the drive mode. The frequency of the drive mode of tuning fork 13 is approximately 10,860 Hz.

During operation of the rotation rate sensor 10, the tuning fork 13 is subject to a rotation about the Y axis. In response, the drive tines 31 and 32 experience generally equal but opposing Coriolis accelerations in planes parallel to the YZ plane. These time-varying accelerations cause the drive tines 31 and 32 to vibrate out of the XY plane at the resonant frequency of the drive mode. As a result, the Coriolis accelerations of the drive tines 31 and 32 in the planes parallel to the YZ plane are in phase with the velocity of the drive tines 31 and 32 in the XY plane.

Because of the opposing time-varying accelerations, the frame 30 of the tuning fork 13 will experience a time-varying torsion. This time-varying torsion is coupled to the pickup tines 44 and 45 with the torque transfer limbs 24 and 25 and causes the pickup tines 44 and 45 to vibrate generally in planes parallel to the YZ plane at the same frequency at which the drive tines 31 and 32 vibrate. The suspension system 59 enables the time-varying torsion to be properly coupled to the pickup tines 44 and 45.

When the pickup tines 44 and 45 vibrate, this is known as the pickup mode. In the absence of Coriolis induced accelerations, the pickup tines 44 and 45 may vibrate at their normal resonant frequency in the pickup mode. The resonant frequency of the pickup mode is approximately 11,390 Hz. However, as was suggested earlier, in the presence of Coriolis accelerations, the pickup tines 44 and 45 are forced to vibrate in the pickup mode at the frequency at which the drive tines 31 and 32 vibrate.

The pickup circuit 172 of the rotation rate sensing circuit 21 includes a pickup low output terminal 184. The terminal 184 provides the electrodes 139-142 with a ground 143. This is done via the pickup low feedthrough 159, the pickup low wirebond 169, the pickup low contact pad 147, and the leads 144, 145, and 149 (not shown).

As is well known in the art, when the pickup tines 44 and 45 vibrate, the strains imposed on the piezoelectric material of the pickup tines 44 and 45 cause oscillating electric field gradients to be generated in the pickup tines 44 and 45. In response, the pickup high electrodes 130-133 together pickup an oscillating rotation (or pickup high) signal 134. The rotation signal 134 represents the summed together time-varying strains experienced by the pickup tines 44 and 45 and corresponds to the actual rate of rotation of the tuning fork 13. The rotation signal 134 is provided by the electrodes 130-133 to the pickup high input terminal 185 of the pickup circuit 172. This is done via the pickup high feedthrough 158, the pickup high wirebond 168, the pickup high contact pad 135, and the lead 137 (not shown).

In response to receiving the pickup high signal 134, the pickup circuit outputs a rate signal 188 at the output terminal 189. The rate signal 188 represents the rotation rate of the tuning fork 13. It is proportional to the magnitude of the component of the pickup high signal 134 which is proportional to the applied rate of rotation and to the Coriolis accelerations experienced by the drive tines 31 and 32 of the tuning fork 13.

Figure 7:
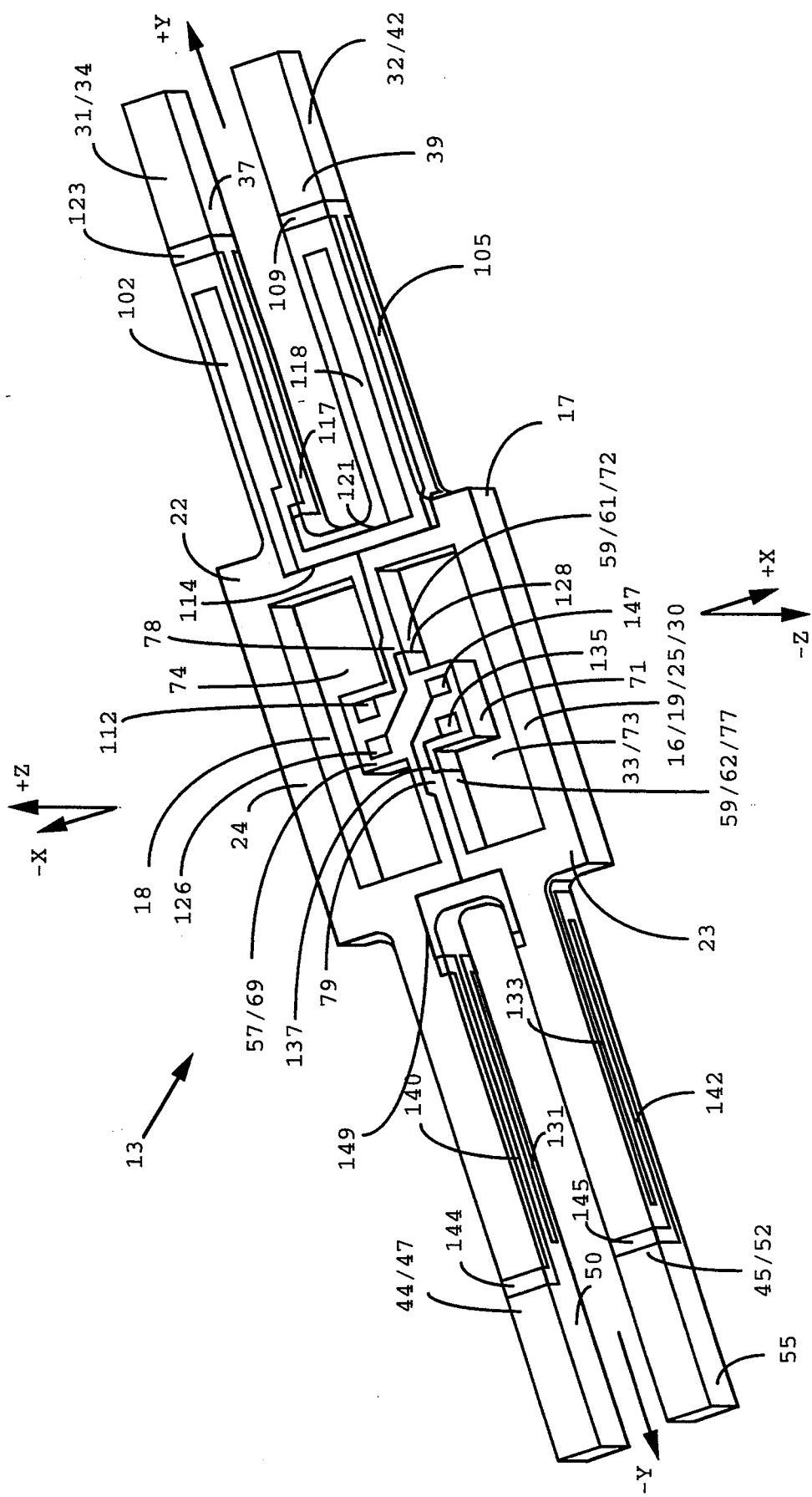
FIG. 7 is a three dimensional view of the front of another embodiment of the double ended tuning fork for the rotation rate sensors shown in FIGS. 1, 10, and 12.
Figure 8:
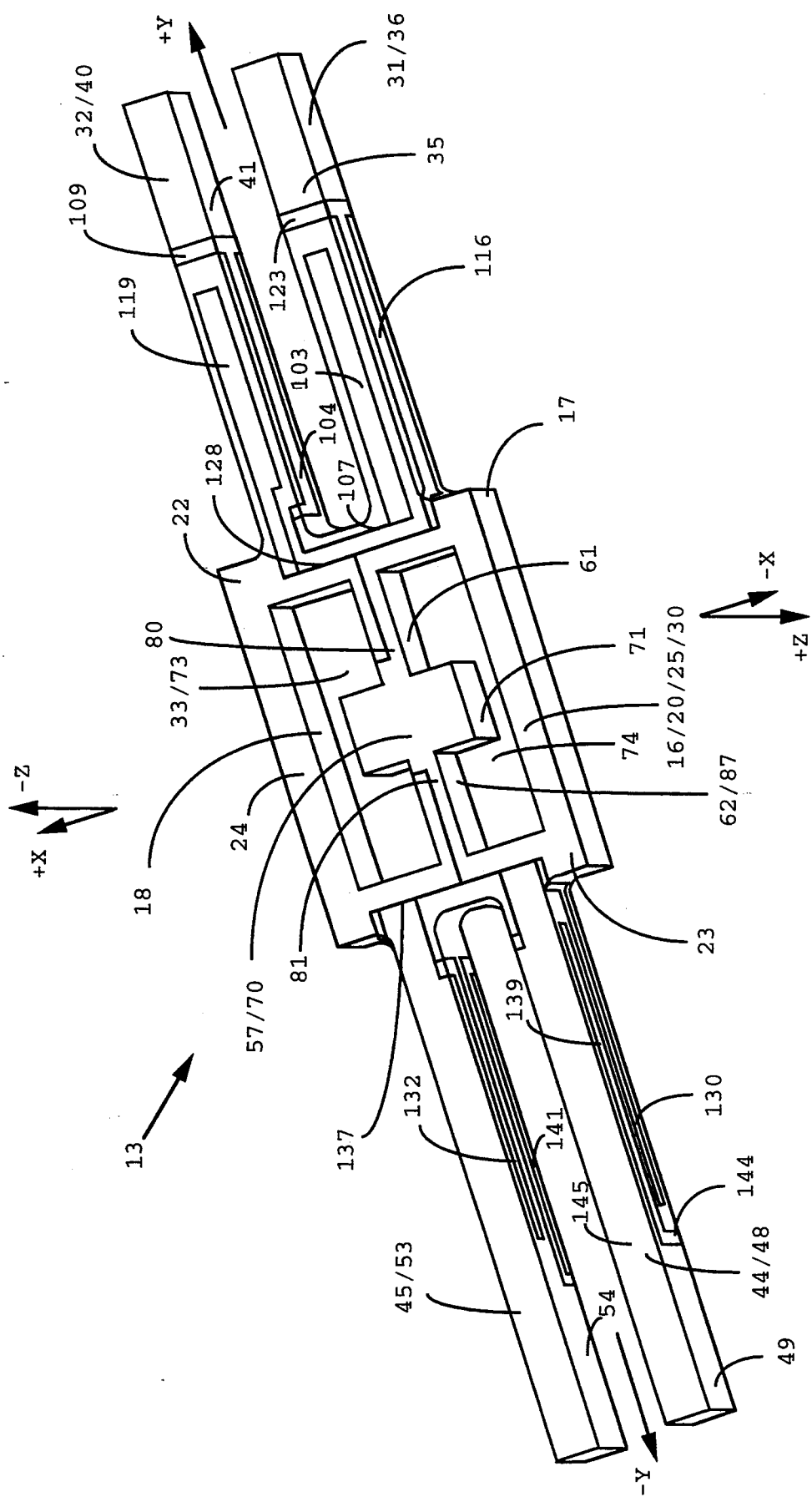
FIG. 8 is a three dimensional view of the back of the double ended tuning fork shown in FIG. 7.

FIGS. 7 and 8 show an alternative configuration for tuning fork 13. In these figures, components similar to those in FIGS. 2 and 3 are designated by the same reference numerals.

Referring to FIGS. 7 and 8, the tuning fork 13 of this embodiment also has a single exclusive mounting base 57 spaced from and centrally disposed within the internal perimeter surface 18 of the frame 30. Furthermore, the mounting base 57 has a back surface 70 which is the single exclusive mounting surface of tuning fork 13. As shown in FIG. 1, the single exclusive mounting surface 70 is fixed to the mounting surface 76 of pedestal 94. This is done in the same way as described earlier for the tuning fork 13 of FIGS. 2 and 3.

However, the suspension system 59 in this embodiment only includes the cross bridges 61 and 62. The cross bridge 61 extends from the single exclusive mounting base 57 in the +Y direction between the openings 73 and 74 of cavity 33. Furthermore, the cross bridge 62 extends from the mounting base 57 in the −Y direction between the openings 73 and 74. Thus, in this configuration the suspension bridges 64-67 and the openings 88 and 95 of the embodiment of tuning fork 13 in FIGS. 2 and 3 have been removed. Otherwise, the tuning fork 13 of this embodiment has essentially the same components as the tuning fork 13 of FIGS. 2 and 3.

The drive high electrodes 102-105 and the drive low electrodes 116-119 are disposed on the drive tines 31 and 32 and coupled together in the same way as was described earlier for the tuning fork 13 of FIGS. 2 and 3. Furthermore, the electrodes 102-105 are coupled to the contact pad 112 in the same way as in FIGS. 2 and 3 except that the portion of the lead 114 between the front surface 19 of the frame 30 and the front surface 69 of the mounting base 57 is disposed only on the front surface 78 of the cross bridge 61. Moreover, the electrodes 116-119 are coupled to the contact pad 126 in the same way as in FIGS. 2 and 3 except that the portion of the lead 128 between the back surface 20 of the frame 30 and the front surface 69 of the mounting base 57 is only disposed on the back, side, front surfaces 80, 72, and 78 of the cross bridge 61.

The pickup high electrodes 130-133 and the pickup low electrodes 139-142 are disposed on the pickup tines 44 and 45 and coupled together in the same way as was described earlier for the tuning fork 13 of FIGS. 2 and 3. In addition, the electrodes 130-133 are coupled to the contact pad 135 in the same way as in FIGS. 2 and 3 except that the portion of the lead 137 between the back surface 20 of the frame 30 and the front surface 69 of the mounting base 57 is disposed only on the back, side, and front surfaces 81, 77, 79 of the cross bridge 62. Also, the electrodes 139-142 are coupled to the contact pad 147 in the same way as in FIGS. 2 and 3 except that the portion of the lead 149 between the front surface 19 of the frame 30 and the front surface 69 of the mounting base 57 is only disposed on the front surfaces 79 of the cross bridge 62.

Figure 9:
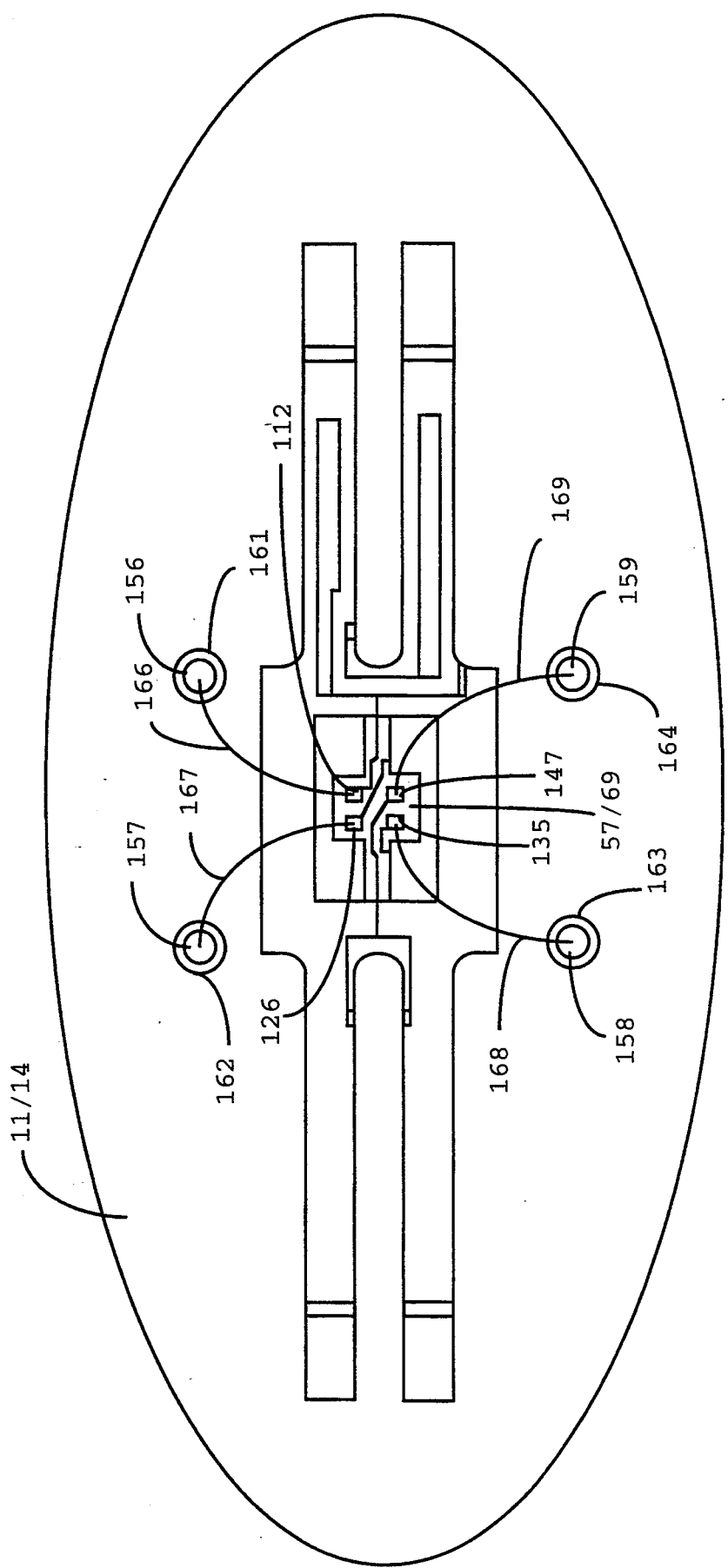
FIG. 9 is a top view of the tuning fork of FIGS. 7 and 8 mounted to the mounting structure of FIG. 4.

Furthermore, as shown in FIG. 9, the contact pads 112,126, 135, and 147 are coupled to the feedthroughs 156–159 in the same way as was described earlier for the tuning fork 13 of FIGS. 2 and 3. This means that the tuning fork 13 of FIGS. 7 and 8 is coupled to the sensing circuit 21 in a similar fashion to that of the tuning fork 13 in FIGS. 2 and 3. As a result, the operation of the tuning fork 13 of FIGS. 7 and 8 in conjunction with the sensing circuit 21 is very similar to that of the tuning fork 13 of FIGS. 2 and 3.

Figure 10:
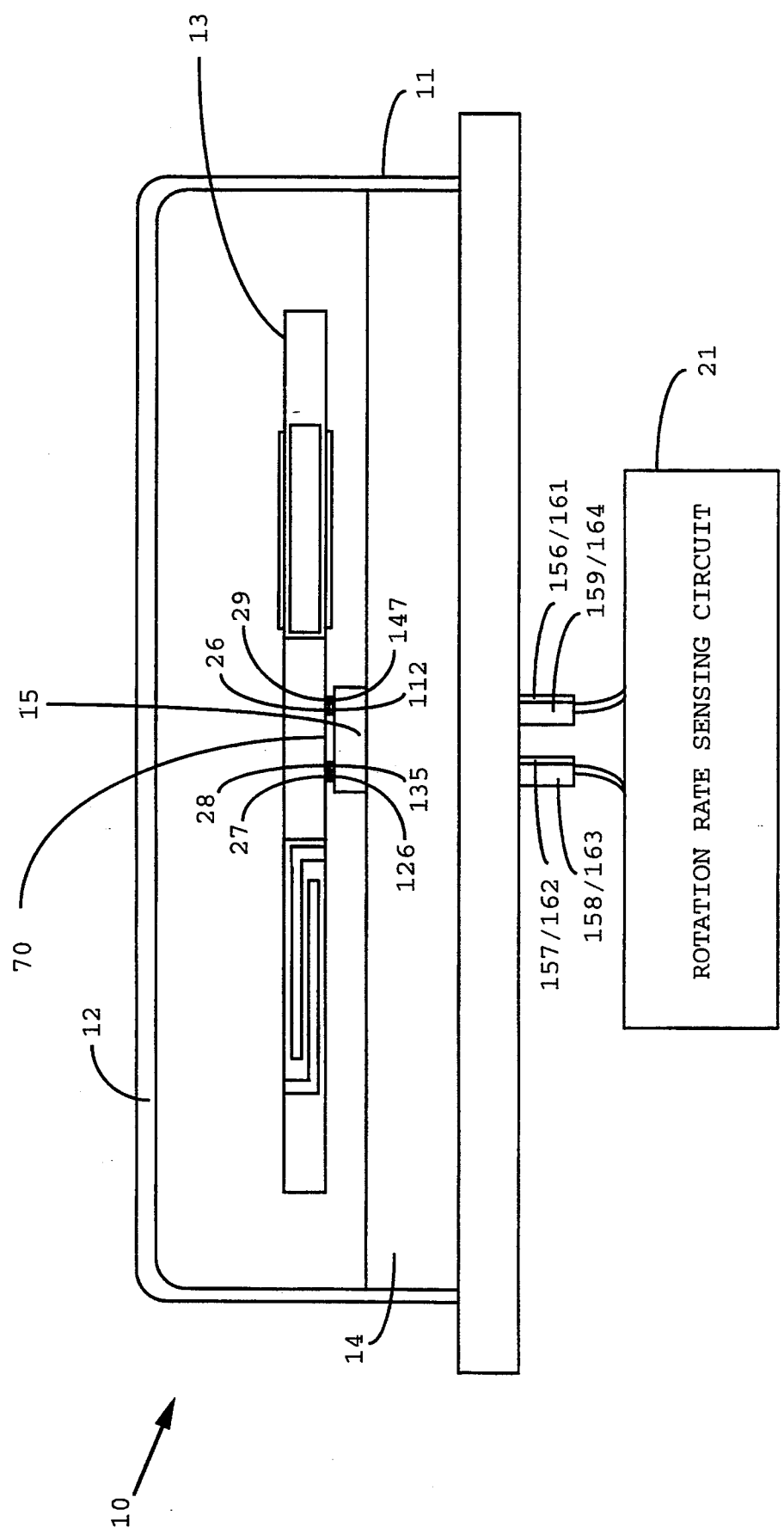
FIG. 10 is a cross sectional side view of another embodiment of a rotation rate sensor in accordance with the present invention.

FIG. 10 shows an alternative embodiment for rotation rate sensor 10. This embodiment can be used with the tuning fork 13 of FIGS. 2 and 3 and also with the tuning fork 13 of FIGS. 7 and 8.

Figure 11:
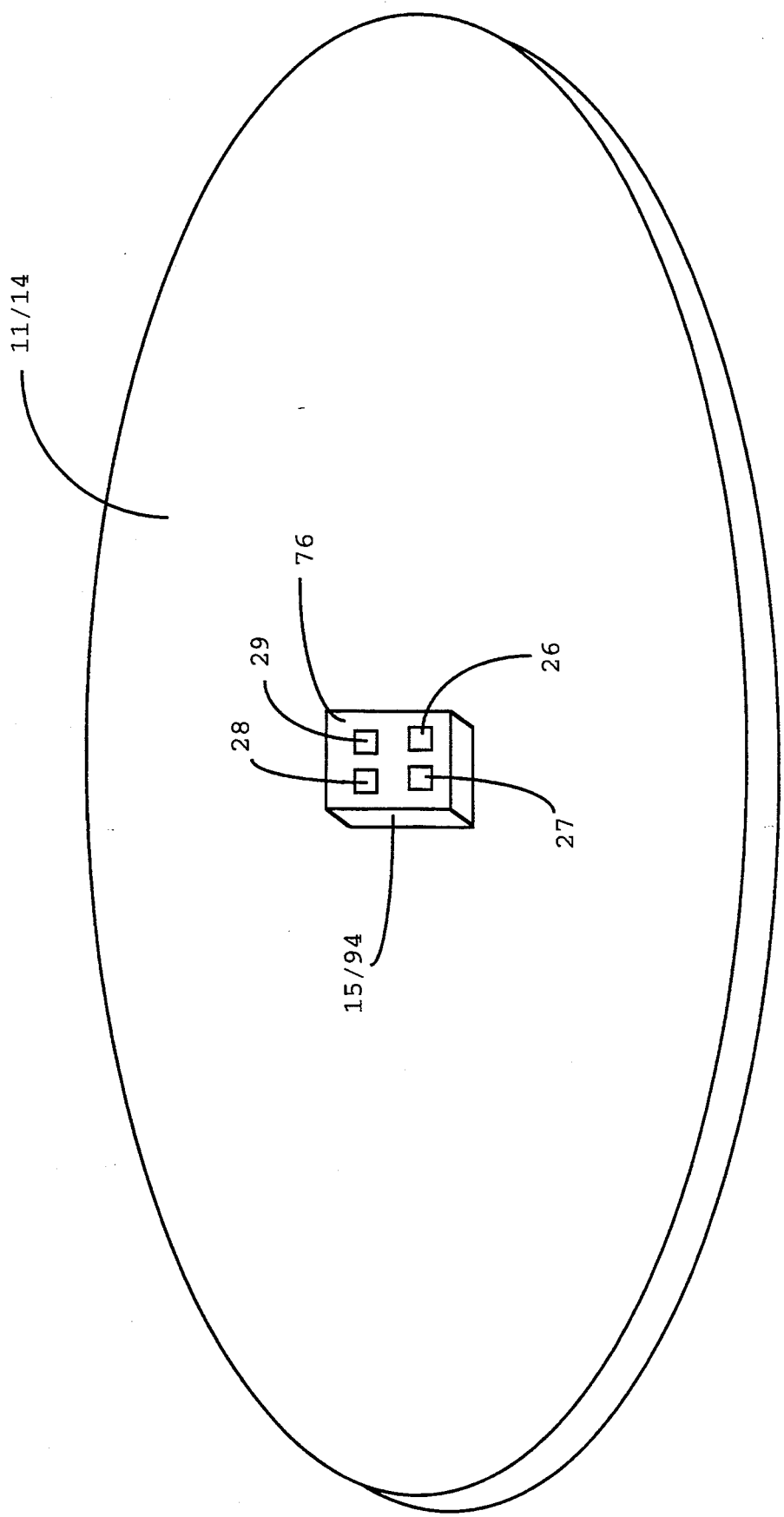
FIG. 11 is a three dimensional view of the base and mounting structure of the housing of the rotation rate sensor shown in FIG. 10.

FIG. 11 shows the base 14 and mounting structure 15 of the housing 11 of the rotation rate sensor of FIG. 10. In this embodiment, the mounting structure 15 is a pedestal 95 with an electrical drive high contact element 26, an electrical drive low contact element 27, an electrical pickup high contact element 28, and an electrical pickup low contact element 29.

Referring back to FIG. 10, in this embodiment, the front surface 69 of the mounting base 57 is the single exclusive mounting surface of the tuning fork 13. The mounting base 57 is mounted to the pedestal 95 through an electrical and mechanical connection of the contact elements 26–29 of the pedestal 95 with the contact pads 112, 126, 135, and 147 located on the single exclusive mounting surface 69. This type of connection is accomplished by fixing the contacts 26–29 to the contact pads 112,126,135, and 147 respectively with a bonding material that is also electrically conductive.

The bonding material of this embodiment may be solder or gold epoxy. Furthermore, the pedestal 95 of FIG. 11 may be any insulating material including a ceramic material or a printed circuit board. The contact elements may be the feedthroughs 156–159 shown in FIG. 10 which extend through the base 14 and the pedestal 95. Alternatively, the contacts may be contact pads that are fixed to the pedestal 95 and which are coupled to the feedthroughs 156–159 through vias disposed in the insulating material of the pedestal 95. These contact pads also may be coupled to the sensing circuit 21 by traces or leads extending from the pedestal 95. The pedestal 95 has a surface 76 which has approximately the same dimensions as does the mounting surface 69 of the tuning fork 13.

Figure 12:
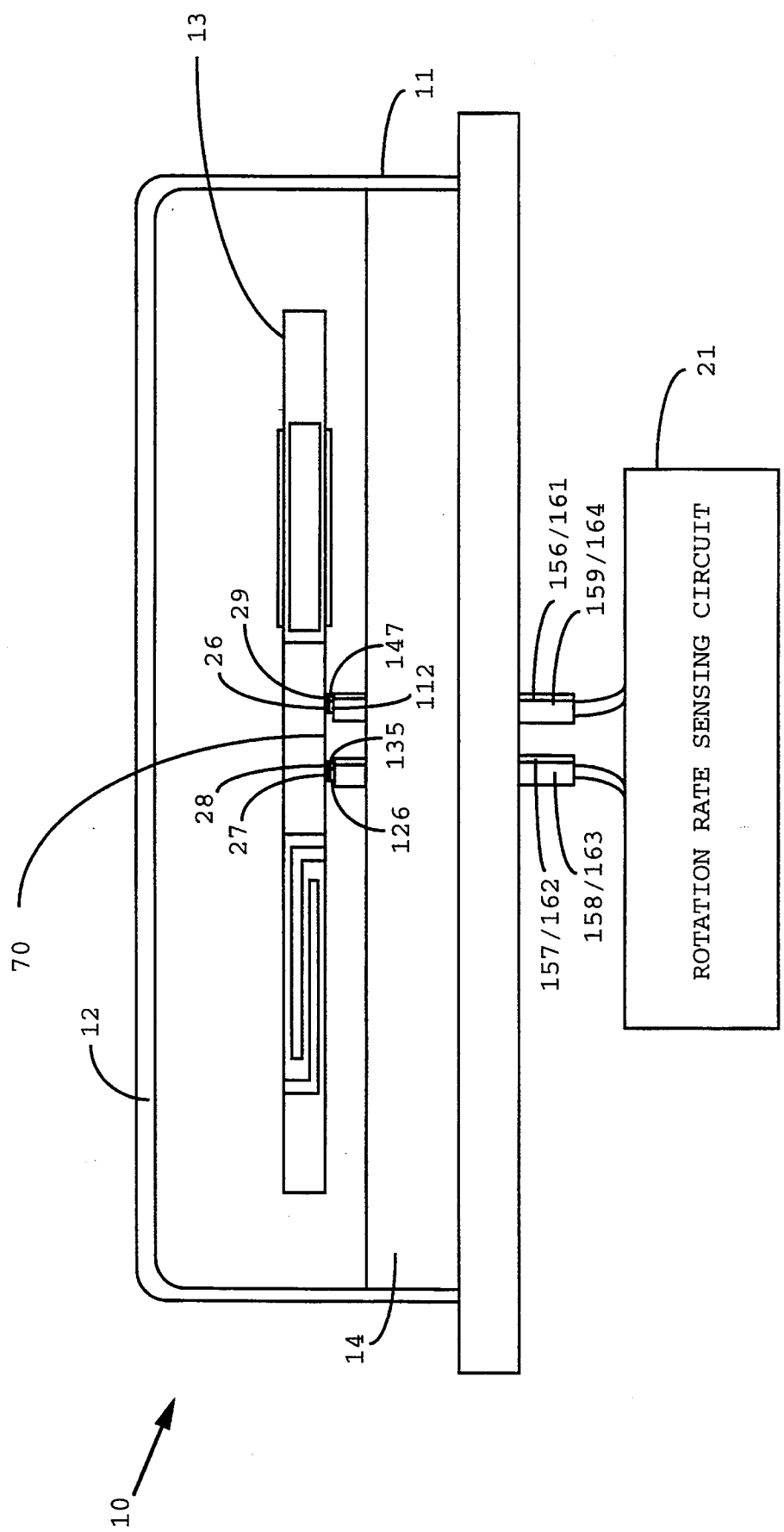
FIG. 12 is a cross sectional side view of still another embodiment of a rotation rate sensor in accordance with the present invention.

FIG. 12 shows another alternative embodiment for rotation rate sensor 10. This embodiment can also be used with the tuning fork 13 of FIGS. 2 and 3 and the tuning fork 13 of FIGS. 7 and 8.

Figure 13:
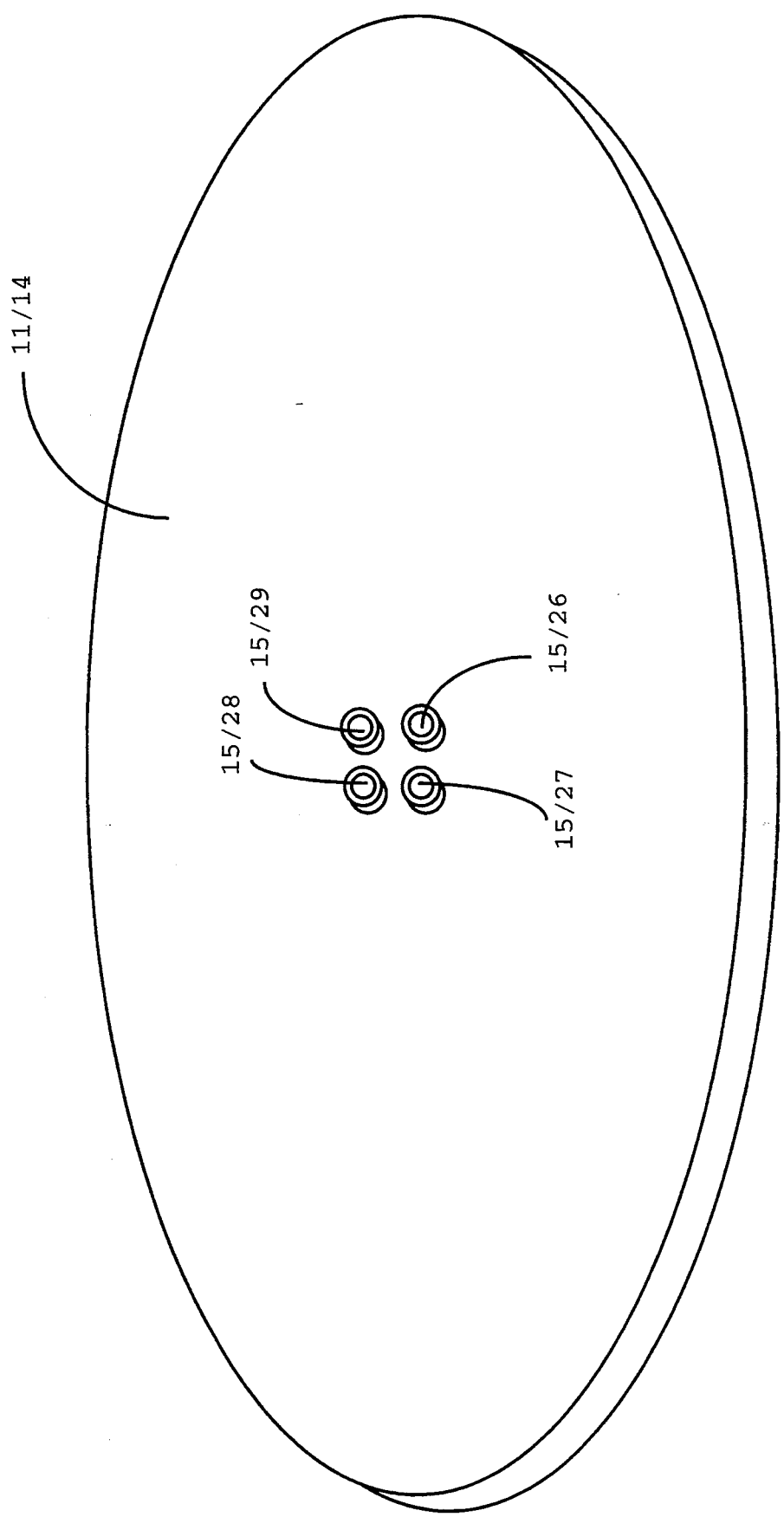
FIG. 13 is a three dimensional view of the base and mounting structure of the housing of the rotation rate sensor shown in FIG. 12.

FIG. 13 shows the base 14 and mounting structure 15 of the housing 11 of the rotation rate sensor of FIG. 12. In this embodiment, the mounting structure 15 is the set of feedthroughs 156–159 and the surrounding insulating rings 161–164.

Referring back to FIG. 12, in this embodiment as well, the front surface 69 of the mounting base 57 is the single exclusive mounting surface of the tuning fork 13. The tuning fork 13 is mounted to the feedthroughs 156–159 through an electrical and mechanical connection of the contact area of the feedthroughs 156–159 with the contact pads 112,126,135, and 147. This connection is accomplished in the same way as that described for the embodiment of FIG. 10 in that the feedthroughs 156–159 are fixed to the contact pads 112,126, 135, and 147 respectively with an electrically conductive bonding material.

As was the case in the embodiment of FIG. 10, the bonding material of this embodiment may be solder or gold epoxy. Furthermore, the insulating rings may be any insulating material including glass.

Figure 14:
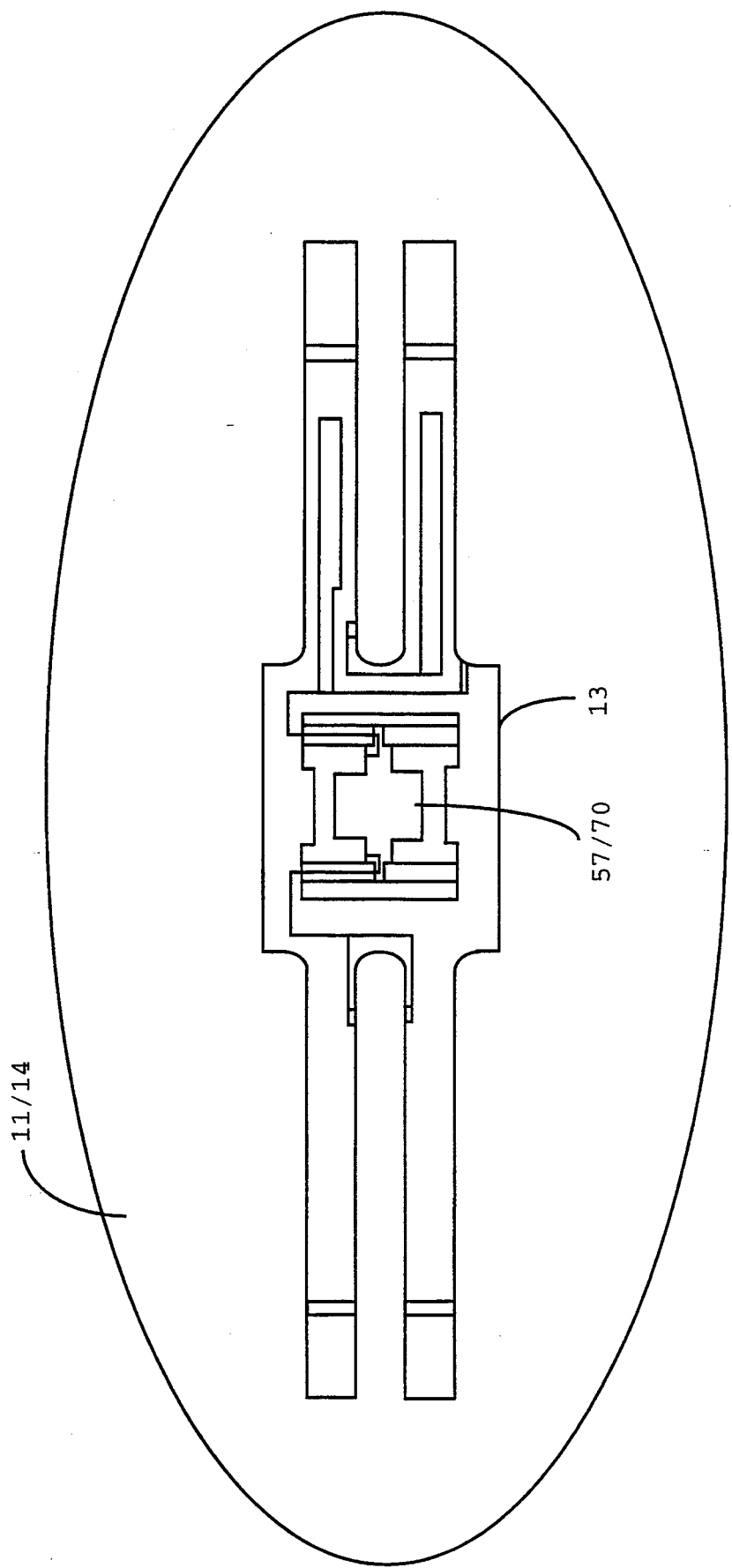
FIG. 14 is a top view of the tuning fork of FIGS. 2 and 3 mounted to the mounting structure of FIG. 11 or 13.
Figure 15:
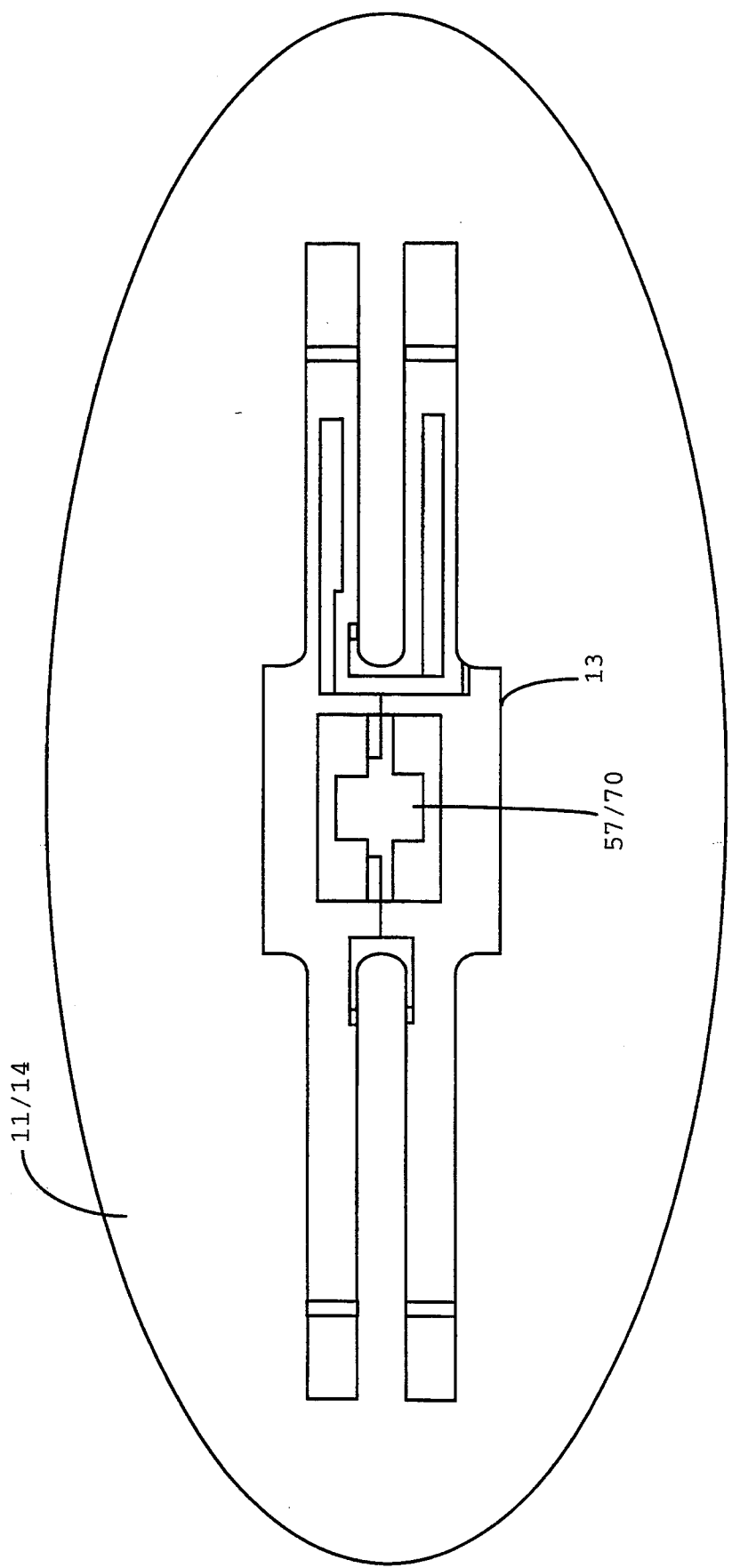
FIG. 15 is a top view of the tuning fork of FIGS. 7 and 8 mounted to the mounting structure of FIG. 11 or 13.

FIGS. 14 and 15 respectively show top views of the tuning fork 13 of FIGS. 2 and 3 and the tuning fork 13 of FIGS. 7 and 8 mounted to the housing 11 shown in FIG. 11 or FIG. 13. Because the coupling of tuning fork 13 to the housing 11 is both mechanical and electrical, the need for the wirebonds 166–169 is eliminated in these approaches. This prevents the possibility that the rotation rate sensor 10 will be affected during operation by resonating wirebonds.

Various other embodiments for the tuning fork 13 and the rotation rate sensor 13 may exist. For example, the placement of the electrodes, leads, and contact pads on the various embodiments of tuning fork 13 may vary for different types of piezoelectric materials and/or crystallographic orientations. Moreover, the mounting structure 15 may simply be the base 14 of the housing 11. In this case, the tuning fork 13 may include an integrally formed pedestal which has a single exclusive mounting surface which is fixed to the base 14.

In view of the foregoing discussion, it is also clear that the single mounting surface approach described herein has numerous features which distinguish it from the prior art multiple mounting surface approaches. Furthermore, these features provide the single mounting surface approach with numerous advantages over the multiple mounting surface approach.

One advantage is that the housing material to which the tuning fork 13 is mounted need not be limited to the Nickel alloy Monel 400. The tuning fork 13 is only mounted to the mounting surface 70 and nowhere else. Therefore, unlike the multiple mounting surface approach, there are no opposing strains imparted on the tuning fork 13 due to the mismatched coefficients of thermal expansion of the housing and tuning fork materials. As a result, variations in the frequencies of the drive and pickup modes due to temperature variations are minimized.

Several other advantages can be observed from the following tables. These tables provide the mode number, the approximate resonant frequency, and the mode shape for the first nine vibrational modes of the tuning fork 13 of FIGS. 2 and 3 and the first seven vibrational modes of the tuning fork 13 of FIGS. 7 and 8.

| Mode Table for Tuning Fork of FIGS. 2 & 3 | | |
| --- | --- | --- |
| Mode | Mode Frequency | Mode Shape |
| 1 | 2860 Hz | X Rotation |
| 2 | 5320 Hz | Z Rotation |
| 3 | 6,030 Hz | Pickup Drive |
| 4 | 6,890 Hz | Y Rotation |
| 5 | 7,180 Hz | Z Banana |
| 6 | 8,660 Hz | X Banana |
| 7 | 10,860 Hz | Drive |
| 8 | 11,390 Hz | Pickup |
| 9 | 14,350 Hz | Y Rotation Overtone |

| Mode Table for Tuning Fork of FIGS. 7 & 8 | | |
| --- | --- | --- |
| Mode | Mode Frequency | Mode Shape |
| 1 | 6550 Hz | Y and Z Rotation |
| 2 | 7020 Hz | Pickup Drive |
| 3 | 9,900 Hz | X Rotation |
| 4 | 10,380 Hz | X Banana |
| 5 | 11,670 Hz | Drive |
| 6 | 11,860 Hz | Pickup |
| 7 | 14,000 Hz | Drive Pickup |

As is evident from the tables, tuning fork 13 of FIGS. 2 and 3 has only six resonant vibrational modes below the drive and pickup modes while the tuning fork 13 of FIGS. 7 and 8 has only four resonant vibrational modes below the drive and pickup modes. Therefore, unlike the prior art, only a few resonant vibrational modes can be induced by external vibrations having frequencies below the resonant frequencies of the drive and pickup modes of either of these two embodiments.

As is also evident from the tables, each of the vibrational modes has a resonant frequency above 2,500 Hz. Furthermore, the resonant frequencies of all modes other than the pickup mode are at least 2000 Hz away from the resonant frequency of the drive mode. Therefore, unlike the prior art, the vibrational modes of the tuning fork 13 of either embodiment will not be induced by common external vibrations below 2,000 Hz which may be multiplied by tuning fork 13.

Furthermore, another advantage of the single mounting surface approach described herein is that there is no external suspension system for mounting the tuning fork 13 in the housing 11. As a result, the compact internal suspension system design of the tuning fork 13 of either embodiment allows for more tuning forks to be etched from a single wafer of piezoelectric material.

While the present invention has been described with reference to a few specific embodiments, the description is illustrative of the invention and is not to be construed as limiting the invention. In particular, the single mounting surface approach described herein may be suitable for acceleration sensors and sensors that sense accelaration and rotation. Furthermore, various modifications may occur to those skilled in the art without departing from the true spirit and scope of the invention as defined by the appended claims.

What is claimed is:

1. The tuning fork of claim 5 wherein said mounting surface is substantially centrally disposed within said internal perimeter of said body.

2. A tuning fork for use in a rotation rate sensor, comprising:
    a pair of drive tines;
    a pair of pickup tines;
    a body having an internal perimeter, said drive tines and pickup tines joined to said body;
    a mounting base having a mounting surface disposed within said internal perimeter of said body; and
    a suspension system disposed within said internal perimeter of said body and joining said mounting base to said body.

3. A tuning fork, comprising:
    a body having an internal perimeter;
    a pair of drive tines joined to said body;
    a pair of pickup tines joined to said body;
    a mounting base disposed within said internal perimeter of said body for mounting said tuning fork; and
    a suspension system disposed within said internal perimeter of said body and joining said mounting base to said body.

4. The tuning fork of claim 3 wherein said mounting base is substantially centrally disposed within said internal perimeter of said body.

5. The tuning fork of claim 3 wherein said suspension system includes:
    a first and a second cross bridge each joined to said mounting base; and
    a first and second pair of suspension bridges, said first pair of suspension bridges each joined to said first cross bridge and to said body, said second pair of suspension bridges each joined to said second cross bridge and to said body.

6. The tuning fork of claim 3 wherein said suspension system includes a pair of bridges each joined to said mounting base and said body.

7. A rotation rate sensor, comprising:
    a housing; and
    a double ended tuning fork including:
        a body having an internal perimeter;
        a pair of drive tines joined to said body;
        a pair of pickup tines joined to said body;
        a mounting base disposed within said internal perimeter of said body and having a mounting surface, said tuning fork mounted to said housing at said mounting surface; and
        a suspension system disposed within said internal perimeter of said body and joining said mounting base to said body.

8. The rotation rate sensor of claim 7 wherein said suspension system includes:
    a first and a second cross bridge each joined to said mounting base; and
    a first and second pair of suspension bridges, said first pair of suspension bridges each joined to said first cross bridge and to said body, said second pair of suspension bridges each joined to said second cross bridge and to said body.

9. The rotation rate sensor of claim 7 wherein said suspension system includes a pair of bridges each joined to said mounting base and said body.

10. The rotation rate sensor of claim 7 further comprising:
    a drive high and a drive low contact pad fixed to said mounting base; and
    a pickup high and a pickup low contact pad fixed to said mounting base.

11. The rotation rate sensor of claim 10 wherein:
    said housing includes a mounting structure, said mounting structure including a drive high contact element, a drive low contact element, a pickup low contact element, and a pickup high contact element;
    said drive high contact pad, said drive low contact pad, said pickup high contact pad, and said pickup low contact pad are all disposed on said mounting surface and respectively connected to said drive high contact element, said drive low contact element, said pickup low contact element, and said pickup high contact element.

12. The rotation rate sensor of claim 11 wherein said drive high contact pad, said drive low contact pad, said pickup high contact pad, and said pickup low contact pad are respectively connected to said drive high contact element, said drive low contact element, said pickup low contact element, and said pickup high contact element with an electrically conductive bonding material.

13. A tuning fork comprising:
a generally planar body having a peripheral frame and an internal cavity defined by said frame;
a pair of drive tines extending from and coplanar with said frame;
a pair of pickup tines coplanar with said frame and said drive tines extending from said frame in a direction opposite to said drive tines; and
a generally planar mounting base disposed within said cavity and connected to said frame, said mounting base having a generally planar mounting surface lying in a plane parallel to the tines and within the cavity for mounting the tuning fork to an external structure.

14. A tuning fork, comprising:
a body having a peripheral frame and an internal cavity defined by said frame;
a pair of drive tines extending from said frame;
a pair of pickup tines extending from said frame in a direction opposite to said drive tines;
a mounting base disposed within said cavity and spaced from said frame; and
a suspension system disposed within said cavity and interconnecting said mounting base and said frame.

15. The tuning fork of claim 14 wherein said frame is generally planar and said drive tines, said pickup tines, and said mounting base are coplanar with said frame.

16. A tuning fork comprising:
a body having a generally planar frame and an internal cavity defined by said frame;
a pair of drive tines extending from and coplanar with said frame;
a pair of pickup tines extending from and coplanar with said frame;
a mounting base disposed within said cavity and spaced from said frame;
first and second cross bridges disposed within said cavity and connected to said mounting base;
a first pair of suspension bridges disposed within said cavity and connected between said first cross bridge and said frame; and
a second pair of suspension bridges disposed within said cavity and connected between said second cross bridge and said frame.

17. The tuning fork of claim 16 wherein said mounting base is coplanar with said frame.

18. The tuning fork of claim 16 wherein said drive tines and said pickup tines extend from said frame in opposite directions.

19. The tuning fork of claim 16 wherein:
said cross bridges extend from said mounting base in opposite directions; and
said first pair of suspension bridges is oppositely disposed within said cavity from said second pair of suspension bridges.

20. A tuning fork comprising:
a body having a generally planar frame and an internal cavity defined by said frame;
a pair of drive tines extending from and coplanar with said frame;
a pair of pickup tines extending from and coplanar with said frame;
mounting means disposed within said cavity and spaced from said frame;
a pair of bridges disposed within said cavity and interconnecting said mounting base and said frame.

21. The tuning fork of claim 20 wherein said mounting base is coplanar with said frame.

22. The tuning fork of claim 20 wherein said drive tines and said pickup tines extend from said frame in opposite directions.

23. The tuning fork of claim 20 wherein said pair of bridges extend from said mounting base in opposite directions.

* * * * *